Figure 1:
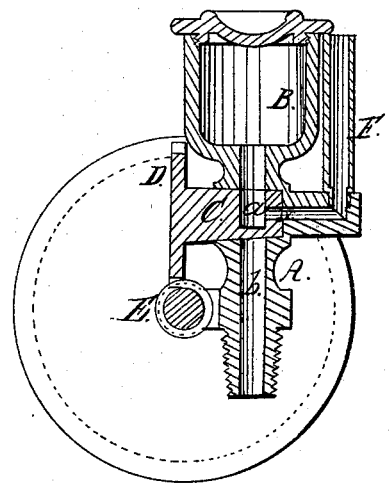
Figure 2:
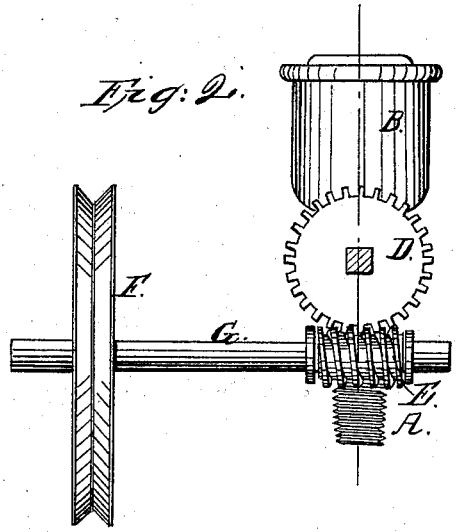

J. G. Edgell,
Lubricator.

No. 68,057.        Patented Aug. 27, 1867.

Witnesses:
A. N. Marr
W. Stockbridge

Inventor:
James George Edgell
Alexander F. Mason
Attys

United States Patent Office.

JAMES G. EDGELL, OF BROOKLYN, NEW YORK.

Letters Patent No. 68,057, dated August 27, 1867.

IMPROVEMENT IN LUBRICATORS FOR SHAFTING.

The Schedule referred to in these Letters Patent and making part of the same.

TO ALL WHOM IT MAY CONCERN:

Be it known that I, JAMES GEORGE EDGELL, of Brooklyn, in the county of Kings, and in the State of New York, have invented certain new and useful Improvements in "Shaft-Lubricators;" and do hereby declare that the following is a full, clear, and exact description thereof, reference being had to the accompanying drawings, and to the letters of reference marked thereon. In the annexed drawings, making part of this specification—

A represents a pipe, which is provided at its upper end with an oil-chamber or cup, B, and at its lower end with a screw-thread, which said thread is intended to enter a corresponding socket or chamber immediately over and communicating with the journal or bearing to be lubricated. The chamber B is covered by a close-fitting top. C represents a conical stop-cock plug, which enters an opening made to receive it in the side of the pipe A. This plug has a cup, $a$, formed in one side of it, and is in the line of the opening through pipe A, through which the oil passes from the chamber B to the bearing to be lubricated. When the plug is so turned that the mouth of its cup is upward or facing chamber B, oil from said chamber passes into the cup $a$ and fills it, and when the plug is revolved partially around it closes the opening to the chamber B, carrying the oil in its cup $a$ until the mouth of said cup opens into the opening $b$ of the pipe A, beneath the plug. The cup then empties its oil into opening $b$, from whence it passes down to the bearing to be lubricated. F represents an air pipe which passes into the side of pipe A and communicates with the cup $a$ of plug C at the end of said plug, as seen at $x$. The object of this air pipe is to enable the cup of the plug to discharge and fill itself with oil with perfect ease. The lower portion of pipe A is provided with two ears or wings, in which are formed bearings for a screw-shaft G. E represents the screw-threads on this shaft, which said threads catch between the teeth of a gear-wheel, D, formed on the outer end of plug C, and serve to give motion to it. F represents a pulley on shaft G, from which a belt is intended to pass to a pulley on the shafting of the machinery which this machine is intended to lubricate. The shaft G being set in motion, it communicates a rotary motion to plug C through wheel D. Every revolution of the plug takes a cupful of oil from the chamber B and supplies it to the bearing. The cup can be made small, and the wheel large enough to supply any required amount of oil to the bearing.

Having thus fully described my invention, what I claim as new, and desire to secure by Letters Patent, is—

1. The plug C, provided with an opening in its end to communicate with pipe F, and a cup, $a$, to receive and discharge oil, as and for the purpose specified.

2. The arrangement of the shaft G, with its screw-thread E and pulley F, with the wheel D upon plug C, substantially as and for the purpose set forth.

In testimony that I claim the foregoing, I have hereunto set my hand this 21st day of February, 1867.

JAS. G. EDGELL.

Witnesses:
HARMAN C. SCHULTZ,
S. COOPER.